United States Patent [19]

Jagur-Grodzinski et al.

[11] 4,008,191
[45] Feb. 15, 1977

[54] POLYMER ALLOY MEMBRANES CONSISTING OF INHERENTLY ENTANGLED BLENDS OF POLYMERIC PHOSPHONATE AND SECOND POLYMER COMPONENT CONTAINING ESTER GROUPS OR POLYSTYRENE

[75] Inventors: Joseph Jagur-Grodzinski; David Vofsi, both of Rehovot; Israel Cabasso, Jerusalem, all of Israel

[73] Assignee: Yeda Research and Development Co., Ltd., Rehovot, Israel

[22] Filed: Apr. 17, 1975

[21] Appl. No.: 569,055

Related U.S. Application Data

[63] Continuation of Ser. No. 358,061, May 7, 1973, abandoned.

[30] Foreign Application Priority Data

May 12, 1972 Israel .................... 39426

[52] U.S. Cl. .................. 260/17 R; 210/321 R; 260/47 R; 260/862; 260/886; 260/899; 260/DIG. 24; 526/277; 526/278
[51] Int. Cl.$^2$ .................. B01D 13/00; C08L 1/10
[58] Field of Search ......... 210/321 R; 260/DIG. 24, 260/17 R, 47 R, 862, 899, 886; 526/277, 278

[56] References Cited

UNITED STATES PATENTS

| | | | |
|---|---|---|---|
| 3,051,740 | 8/1962 | Abrams et al. ............. | 260/956 |
| 3,161,667 | 12/1964 | Abrams et al. ............. | 260/956 |
| 3,220,989 | 11/1965 | Rolih et al. .................. | 260/88.2 |
| 3,639,506 | 2/1972 | Hoof .......................... | 260/DIG. 24 |
| 3,725,509 | 4/1973 | Kraft et al. .................. | 260/899 |
| 3,745,202 | 7/1973 | Riggleman et al. .......... | 210/321 R |
| 3,792,135 | 2/1974 | Brown et al. ................. | 210/321 R |
| 3,864,289 | 2/1975 | Rendall ....................... | 260/17 |

*Primary Examiner*—Donald Levy
*Assistant Examiner*—Peter F. Kulkosky
*Attorney, Agent, or Firm*—Hubbell, Cohen, Stiefel & Gross

[57] ABSTRACT

The present disclosure relates to improved polymeric materials and to a process for preparing same, which comprises blending suitable polymers into novel polymeric alloys. The disclosure further relates to novel fire-retarding and flame-resistant materials comprising such polymeric alloys and to novel membrane materials and membranes, adapted to provide novel processes of separation based on membrane technology. The novel polymeric alloys comprise commercially available polymers, blended with novel polymeric phosphonates of the general formula:

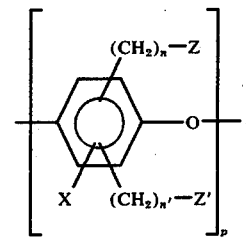

or

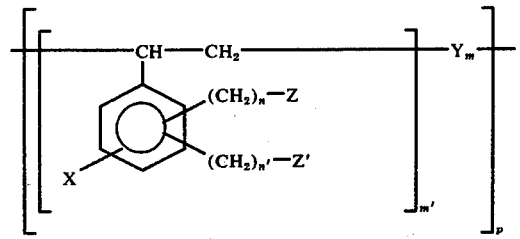

wherein: $m$, $m'$, $n$, $n'$ are zero or any integer,
p is an integer higher than 10
X designates a hydrogen atom halogen atom or a phosphorus containing group
Y designates a $CH_2CHCl$ or $CH_2CCl_2$ group
Z and Z' designates H or a phosphonate group -$PO(OR')(OR'')$ (at least one being a phosphonate group), wherein R and R' are alkyl or aryl groups.

9 Claims, No Drawings

POLYMER ALLOY MEMBRANES CONSISTING OF INHERENTLY ENTANGLED BLENDS OF POLYMERIC PHOSPHONATE AND SECOND POLYMER COMPONENT CONTAINING ESTER GROUPS OR POLYSTYRENE

This is a continuation, of application Ser. No. 358,061, filed May 7, 1973 now abandoned.

BACKGROUND OF THE INVENTION

1. Field of the Invention

The invention relates to novel membranes and membrane materials constituted of novel polymeric alloys.

2. Description of the Prior Art

Blending of polymeric materials represents a well established technique of improving certain properties of a polymeric system with a minimum sacrifice of its other desirable characteristics. Thus, several commercially available heterogeneous polyblends are being used because of improved toughness of such materials. Some homogeneous polyblends are used because of an increased processibility of such systems.

The number of known homogeneous polyblends (polymeric alloys) is, however, rather limited, as their preparation requires a close matching of the solubility parameters of the polymeric components.

Polymeric alloys based on sulfonated polystyrene and copolymers of acrylonitrile have been used as ion exchange membranes and polymeric alloys based on polyvinylpyrrolidone and polyisocyanates have been tested as membranes in desalination processes.

DETAILED DESCRIPTION OF THE PRESENT INVENTION

The present invention relates to improved polymeric materials, and more particularly to novel membrane materials and membranes incorporating such polymers adapted to provide novel processes of separation based on membrane technology. The novel polymeric alloys constituting these materials comprise commercially available polymers, blended with novel polymeric phosphonates of the general formula:

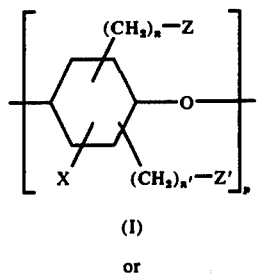

(I)

or

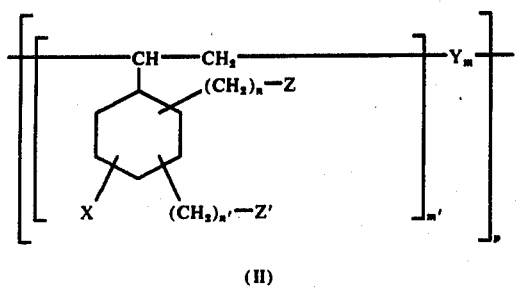

(II)

wherein:

$m$ and $n$ are zero or any integer and $m'$ and $n'$ are any integer, $p$ is an integer higher than 10, X designates a hydrogen atom or halogen atom or a phosphorus containing group, Y designates a $CH_2CHCl$ or $CH_2 CCl_2$ group, and Z and Z' designate H or a phosphonate group - PO (OR') (OR")

(at least one being a phosphonate group) wherein R and R' are alkyl or aryl groups.

Preparation of these novel polymeric phosphonates is based on well established techniques of organic chemistry such as chloromethylation, bromination and "Arbuzov" type phosphorylation: however, the procedures described herein are especially adapted to the preparation of uncrosslinked polymeric phosphonates soluble in many common organic solvents and completely compatible with several commercially available polymeric materials, so as to yield novel polymeric alloys having outstanding properties as fire retarding and flame resistant materials or, in accordance herewith, as membrane materials, the membranes being suitable for separations of organic compounds on the basis of differences of solubility and diffisivity.

Formation of the inherently entangled polymeric alloys (interpolymers) from chemically different polymers was, previously, described only for the case of certain ion exchange resins. On the other hand, a new class of polymeric alloys is described herein.

In accordance with the invention, the percentage of the polymeric phosphonate in the polymeric alloy may be as low as 1% and as high as 90%, preferably between 5–20% for fire retarding compositions and between 20–60% for membrane materials. Membranes prepared from polymeric alloys are especially suitable for the separation of various organic liquids, including azeotropic mixtures, by the well known pervaporation technique. The permeability combined with high selectivity towards constituents of certain mixtures is shown to be superior to that of any other membrane material previously reported in the literature. The molecular entanglement of such interpolymers may be further increased by chemical or radiation crosslinking.

In the following Examples 1 to 7 the preparation of phosphonate group containing polymers is described:

EXAMPLE 1

10 g of styrene-vinylidene chloride copolymer $\eta_{25}0 = 0.34$ in toluene (Cl = 26.65%) are dissolved in 50 ml of dry carbon disulfide and 50 ml of chlorodimethyl ether.

10 g of $AlCl_3$ are slowly added to the vigorously stirred solution. Reaction is continued for 7 hours at room temperature. Wet dioxane is added until purple coloration of the solution disappears.

A polymeric material is precipitated with methanol, redissolved in methylethyl-ketone, filtered and again precipitated with methanol. 5 g of so prepared chlomethylated copolymer (Cl = 35.9%) are dissolved in 25 ml of dry Bis (2-ethoxyethyl) ether (Diethyl Carbitol) and the solution is added dropwise to 30 ml of vigorously stirred triethylphosphite at 150°–160°. The reaction mixture is refluxed for 4 hours. After cooling to room temperature, polymer is precipitated with pentane. Poly(vinylidene chloride - benzyldiethyl phosphonate) (Cl = 15.1%, P = 9.2%) referred to as PVBP is obtained in 90% yield. The polymer is nonflammable and highly hygroscopic. When immersed in water, 1 part absorbs up to 2.5 parts of water at room temperature. PVBP is soluble in aromatic hydrocarbons, ketones, dioxane and hot methanol. Its formula is verified by PMR spectroscopy.

EXAMPLE 2

High molecular weight polystyrene is used as starting material. Chroromethylation is catalyzed by $ZnCl_2$ and the reaction time is 24 h. Otherwise, the procedure is the same as in Example 1.

Polybenzyldiethylphosphonate (Cl = 1.1%; P = 7.5%), further referred to as PBP, is obtained in 80% yield. Its intrinsic viscosity in toluene $\eta$ 25° = 0.944 dl/g. PBP is non-flammable and hygroscopic. When immersed in water, 1 part absorbs up to 0.5 parts of water at room temperature. It is soluble in aromatic hydrocarbons, ketones, dioxane and hot methanol. Its formula is verified by PMR spectroscopy.

EXAMPLE 3

The same procedure as in Example 1 is followed, except that the reaction time of the chloromethylation is 8 hours and the amount of chlorodimethylether is 20% larger than that used in the preparation described in Example 1. A polymer containing 10.63% Cl and 10.5% P, further referred to as $PVBP_1$, is obtained in 90% yield. $PVBP_1$ is non-flammable and highly hygroscopic. When immersed in water, 1 part absorbs 3 parts of water at room temperature. Solubility properties of $PVBP_1$ are similar to that of PVBP described in Example 1.

EXAMPLE 4

12 g of Poly (2.6-dimethyl-1.4-phenylene oxide) (General Electric PPO grade 691-111) are dissolved in 175 ml of tetrachloroethane. This solution is vigorously stirred and 22 g of bromine are added dropwise at room temperature. Addition of bromine is completed within 15–20 minutes. Stirring is continued for about 1 hour (until evolution of HBr nearly stops). PMR spectrum of an aliquot sample indicates that at this stage Poly (2,6 dimethyl-3-bromo-1,4-phenylene oxide) is formed with a nearly stoichiometric yield. The solution is brought to reflux, exposed to actinic light and an additional 72 grams of bromine are added dropwise within a 3 hour period. Reflux is continued until evolution of HBr ceases. The solution is cooled to room temperature and polymer precipitated by methanol. It contains 69.8% bromine and its PMR spectrum indicates that nearly all methyl groups on the polymeric chain are brominated. 10 g of the brominated polymer are dissolved in 50 ml of dry dioxane and the solution is added dropwise within 30 minutes to 50 ml of vigorously stirred and nearly boiling trimethylphosphite. Reflux is continued for another 15–20 minutes until the solution clears up completely. The reaction mixture is cooled to room temperature and polymer precipitated with pentane, redissolved in dioxane and again precipitated with pentane. It contains 42% Br and 9.2% P. The bromophosphated polymer, further referred to as $PPOBrP_2$, is obtained with 95% yield. $PPOBrP_2$ is soluble in dioxane and partially soluble in acetone. It is completely non-flammable and may be spun from its solutions into fibers or cast into mechanically strong films (tensile strength - 3 kg/mm$^2$).

EXAMPLE 5

The same procedure is followed as in Example 4 step, $CCl_4$ is used as solvent instead of tetrachloroethane, and the total amount of bromine used for the bromination is 36 g.

Poly (2-methyl-6-methylenedimethylphosphonate-3-bromo 1,4-phenylene oxide), further referred to as $PPOBrP_1$, is obtained with 90% yield. It contains 30.4% Br and 9.6% P. Its structure is verified by PMR spectroscopy. $PPOBrP_1$ is soluble in dioxane, THF and chlorinated hydrocarbons.

It is non-flammable and slightly hygroscopic. It may be spun from its solutions into fibers or cast into mechanically strong films (tensile strength 2.5 kg/mm$^2$).

EXAMPLE 6

The same procedure is followed as in Example 5, except that triethylphosphite instead of trimethylphosphite is used for the phosphoylation. Poly (2-methyl-6-methylenediethyl phosphonate-3-bromo 1,4-phenylene oxide), further referred to as PPOBrPe, is obtained in 92% yield. It contains 28% Br and 9.1% P. It is soluble in dioxane, THF and chlorinated hydrocarbons. PPOBrPe is nonflammable and slightly hygroscopic. It may be spun from its solutions into fibers or cast into mechanically strong films (tensile strength 2.5 kg/mm$^2$).

EXAMPLE 7

30 g PPO grade 691-111 are dissolved in 500 ml of $CCl_4$ and 150 ml of $CHCl_3$. 92 g of N-bromosuccinimide (NBS) are added to the solution, which is thereafter exposed to actinic light and refluxed for 1 hour. Then, additional portions of NBS 92 g each are added in one hour intervals. Reaction is continued for about 10 hours until NBS is completely converted into succinimide. The solution is cooled to room temperature and polymer precipitated with methanol, redissolved in methylene chloride and again precipitated with methanol. PMR spectrum indicates that about 80% of the methyl groups in PPO are brominated and no bromine substitution in the aromatic ring takes place. The phosphorylation procedure is the same as described in Example 4 and leads to a phosphonated polymer containing 13.03% Br and 11.98% P. This polymer is further referred to as PPOP. PPOP is non-flammable and slightly hygroscopic. It is soluble in dioxane and may be spun from its solutions into filters or cast into films (tensile strength = 2.9 kg/mm$^2$).

The following further examples serve to illustrate the preparation of the polymeralloys:

The two polymers have been blended to form a polymeric alloy in membrane form. PVBP, originally very easily soluble in benzene, is not further leachable by this solvent from the membrane at room temperature. Membranes of these materials are highly permeable to benzene and to other aromatic solvents, and may be used for their selective removal from mixtures with other solvents such as, for example, saturated or unsaturated aliphatic hydrocarbons by the well known technique of "pervaporation." Such alloys are also self extinguishing and some compositions are also non-flammable. These may be used in the form of fibers, foams, fabrics, films and the like.

EXAMPLE 8

5.5 g of PVBP prepared as described in Example 1, and 8.5 g of acetyl cellulose (Eastman-Kodak 394-45) are dissolved in 100 g of dioxane. A 100µ thick film is cast with a doctor blade on a glass plate. Dioxane is evaporated at room temperature for 24 hours. Remaining dioxane is removed in vacuum at 30° for 3 hours.

A transparent homogenous membrane is stripped off the glass plate after it is immersed in water. It is self-extinguishing (see Table I) and its tensile strength is 6.3 kg/mm².

EXAMPLE 9

Polymeric films consisting of a polymeric alloy are prepared from PPOP and acetyl cellulose in the same way as described in Example 8 for PVBP, the ratio of PPOP/acetyl cellulose being, however, 1:1. A transparent, mechanically strong (tensile strength 5.9 Kg/mm²) film is obtained. It is non-flammable and acts as a highly permeable membrane for aromatic hydrocarbons (cf. Table I).

EXAMPLE 10

Polymeric alloys consisting of PPOBrP$_2$ and acetyl cellulose are prepared in the same way as described in Example 8, except the ratio of the two polymers is changed. Table I summarizes the tensile strength, and fire-retarding properties of polymeric alloys prepared in this way for varying ratios of PPOBrP$_2$ to acetyl cellulose. Water uptake of the phosphonate group containing copolymers is sharply reduced by blending with acetyl cellulose, and consequently, their dimensional stability is greatly improved. This is clearly demonstrated by the values given in Table II.

EXAMPLE 11

4 g of PPOBrP$_2$ and 10 g of high molecular weight polystyrene $\eta$ 25°C = 0.908 dl/g are dissolved in 100 g of dioxane at 40° C. A membrane consisting of a polymeric alloy of PPOBrP$_2$ and polystyrene is prepared in the same way as described in Example 8, except that both casting and evaporation of dioxane are performed at 40° C. A homogenous material is obtained. It is self-extinguishing (3 sec. according to ASTM D.635). Its hardness (Barcoll-940) is 41.

EXAMPLE 12

25 g of PPOBrP$_2$ are dissolved in 75 g of styrene. 0.5 g of photosensitizer (Trigonal 14) are added. The solution is brought to 40° and exposed to U.V. radiation: after 1 h of polymerization a transparent homogeneous solid material is obtained. Its hardness (Barcoll-940) is 40 and it is self extinguishing (3 sec. according to ASTM D.635).

EXAMPLE 13

3.5 of PPOBrP$_2$ are mixed with 7.5 g of a general purpose unsaturated polyester resin (crystic LV-191). 0.1 of benzoyl peroxide are added to the thus obtained solution and the sample is polymerized for 24 hours at 50°. Hard transparent polymeric material is obtained. Hardness, according to Barcoll-940, is 46; it is self extinguishing (3.5 sec. according to ASTM D.635).

The following examples illustrate some of the "pervaporative" separations achieved with membranes disclosed in the present invention.

Table I

TENSILE STRENGTH AND FLAMMABILITY OF POLYMERIC ALLOYS

| Component I | | Component II | | Tensile Strength Kg,mm² | Flammability* (ASTM D) 1433–58 |
|---|---|---|---|---|---|
| Cell. acetate (Eastman 394–45) | 100% | — | | 8.0 | burn - 3.5 cm/sec. |
| " | 80% | PPOBrP$_2$ | 20% | 7.3 | self-ext. (2–2.5 sec., 3–6 cm) |
| " | 75% | " | 25% | 6.4 | self-ext. (0–2 sec., 0–4 cm) |
| " | 70% | " | 30% | 6.3 | self-ext. (0–1.5 sec., 0–2 cm) |
| " | 60% | " | 40% | 6.0 | non-flammable |
| " | 50% | " | 50% | 5.8 | non-flammable |
| " | 50% | PPOP | 50% | 5.9 | non-flammable |
| " | 60% | PVBP | 40% | 6.3 | self-ext. (2–3 sec., 5–6 cm) |
| " | 50% | PBP | 50% | 5.7 | self-ext. (1–2 sec., 2–4 cm) |
| cell. triacetate (A-43.2%) | 75% | PPOBrP$_2$ | 25% | 4.75 | self-ext. (0–2 sec., 0–2 cm) |
| " | 75% | PPOP | 25% | 4.7 | self-ext. (1–2 sec., 1–2 cm) |

*Determined for 20µ thick films

Table II

WATER UPTAKE OF POLYPHOSPHONATES OF THEIR POLYMERIC ALLOYS

| Components I | | Components II | | Water uptake after 24 hours' immersion in water at 25° C. |
|---|---|---|---|---|
| Cellulose acetate (Eastman 394–45) | — | PVBP | 100% | 250% |
| " | 20% | " | 80% | 18% |
| " | 30% | " | 70% | 10% |
| " | 20% | PPOBrP$_2$ | 80% | 10% |
| " | — | PBP | 100% | 50% |

Table II-continued

WATER UPTAKE OF POLYPHOSPHONATES OF THEIR POLYMERIC ALLOYS

| Components | | Water uptake after 24 hours' immersion |
|---|---|---|
| I | II | in water at 25° C. |
| " 20% | " 80% | 10% |

EXAMPLE 14

A sintered glass disc (JENA D) served as membrane support. The effective membrane area was 12.5 cm². The product was collected in a liquid air trap. On the product side a vacuum of 25 torrs was maintained throughout the experiment. Membrane was prepared by casting a solution of 6 g of PVBP on a glass plate (prepared as described in Example 1) and 6 g of acetyl cellulose (Eastman 394–45) in 100 g of dioxane. Dioxane was evaporated at room temperature for 24 hours. A 20 μ thick membrane was stripped from the glass plate after immersion in water, and inserted into a pervaporation apparatus: benzene-cyclohexane mixture was added to the apparatus and membrane was conditioned for 1 hour while under reflux of benzene-cyclohexane mixture.

The results obtained with such membrane in pervaporation experiments are given in table III.

Table III

| Feed composition | Temp. °C | Permeability Kg/m² - day | Product Composition | Separation[b] Factor |
|---|---|---|---|---|
| Benzene/cyclohexane 11.5/88.5 | 80 | 1.65 | 65/35 | 14.6 |
| " 55/45[a] | 80 | 24.0 | 93/7 | 10.8 |
| " 75/25 | 80 | 48.0 | 97/3 | 10.7 |
| " 50/50 | 60 | 7.2 | 93/7 | 13.3 |
| " 50/50 | 35 | 1.5 | 95/5 | 19.0 |
| Benzene/cyclohexene 50/50 | 80 | 32.4 | 72/28 | 2.6 |
| Benzene/cyclohexane/cyclohexene 33.3/33.3/33.3 | 80 | 27.5 | 60/30/10 | — |
| Styrene/ethylbenzene 50/50 | 25 | 6.0 | 57/43 | 1.3 |

[a]Azeotropic mixture.
[b]Separation factor = product composition/feed composition.

EXAMPLE 15

6.25 of PVBP prepared as described in Example 1 and 4.37 g of acetylcellulose (Eastman 394-45) were dissolved in a mixture of 22.5 g of acetone and 15 g of dimethyl formamide. A 200μ thick film was cast with a doctor blade on a glass plate, evaporated for 40'' at room temperature and immersed in ice water. The temperature was increased to 82° and the membrane was annealed for 15' at this temperature. A double layer membrane with a very thin dense "skin" and a relatively porous support was thus obtained. Results obtained in a pervaporative separation of a benzene/cyclohexane mixture for such a membrane are as follows:

| Feed composition | Temp. °C | Permeability* Kg/m²-day | Product Composition | Separation Factor |
|---|---|---|---|---|
| Benzene/cyclohexane 50/50 | 80 | 196 | 80/20 | 4.0 |
| " | 24 | 60 | 82/18 | 4.5 |

*Permeability of a membrane, prepared under the same conditions from acetylcellulose only, was at 80° 3.8 Kg/m² - day.

EXAMPLE 16

12.5 of PPOP prepared as described in Example 7, and 12 g of acetylcellulose (Eastman 394-45) were dissolved in a mixture of 50 g of acetone and 30 g of dimethyl formamide. The casting and annealing procedure was the same as described in Example 15. A pervaporative experiment at 80° on a benzene/cyclohexane mixture resulted in a permeability of 29 Kg/m²-day with a separation factor of 6.7.

What we claim is:

1. A highly permeable membrane containing a dense selective "skin" and a porous support suitable for solvent separation in a pervaporative cell, said membrane having enhanced permeability while retaining its selectivity, comprising an inherently entangled polymer alloy composition of between 20 and 60 percent of a first phosphorus and halogen-containing polymer component having the formula:

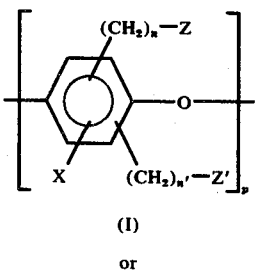

(I)

or

-continued

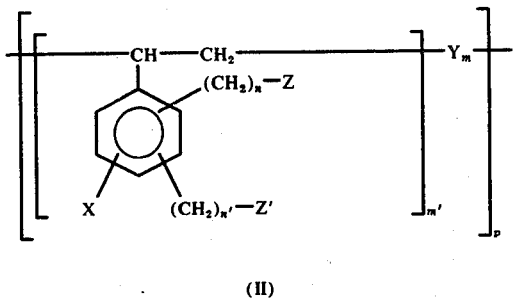

(II)

wherein m and n are zero or any integer and m' and n' are integers, p is an integer higher than 10, X is hydrogen, halogen or a phosphorus-containing group, Y is $CH_2CHCl$ or $CH_2CCl_2$, and Z and Z' are hydrogen or a phosphonate group (at least one being a phosphonate group);

and from 40 to 80 percent of a second polymer component containing ester groups and/or a polystyrene polymer.

2. The membrane of claim 1, wherein the first polymer component has the formula (I), wherein X = bromine, $n = n' = 1$, and $Z' = PO(OMe)_2$ and Z = H or $PO(OMe)_2$.

3. The membrane of claim 1, wherein the first polymer component has the formula (I) wherein X = bromine, $n' = n = 1$, Z = H and $Z' = PO(OMe)_2$, or $PO(OEt)_2$.

4. The membrane of claim 1, wherein the first polymer component has the formula (I) wherein X = H, $n = n' = 1$, $Z = PO(OMe)_2$ and Z' = H or $PO(OMe)_2$.

5. The membrane of claim 1, wherein the first polymer component has the formula (II) wherein Y = $CH_2CCl_2$, $n = o$, $n' = 2$, Z = H and $Z' = PO(OMe)_2$.

6. The membrane of claim 1, wherein the first polymer component has the formula (II) wherein $m = o$, $n = o$, $n' = 2$, Z = H and $Z' = PO(OMe)_2$.

7. The membrane of claim 1, wherein the second polymer component is acetyl cellulose.

8. The membrane of claim 1, wherein the second polymer component is an unsaturated polyester resin.

9. The membrane of claim 1, wherein the second polymer component is a polystyrene.

* * * * *

UNITED STATES PATENT OFFICE
CERTIFICATE OF CORRECTION

Patent No. 4,008,191            Dated February 15, 1977

Inventor(s)  Joseph Jagur-Grodzinski et al

It is certified that error appears in the above-identified patent and that said Letters Patent are hereby corrected as shown below:

Title page, right side, line 3 of Abstract, after the formulas: "hydrogen atom halogen" should read -- hydrogen atom, halogen --.

Title page, right side, lines 4-5 of Abstract, after the formulas: "phosphorus
                containing group" should read
-- phosphorus containing group --.

Column 2, line 24: "diffisivity" should read -- diffusivity --; line 48: "$\eta$" should read -- $\{\eta\}$ --.

Column 3, line 8: "Chroromethylation" should read -- Chloromethylation --; line 14: "$\eta$" should read -- $\{\eta\}$ --;

Column 4, lines 3-4: "Example 4 step, $CCl_4$" should read -- Example 4 except that in the bromination step, $CCl_4$ --; line 21: "phosphoylation" should read -- phosphorylation --; line 43: "80%" should read -- 60% --; line 55: "polymeralloys" should read -- polymer alloys --.

UNITED STATES PATENT OFFICE
CERTIFICATE OF CORRECTION

Patent No. 4,008,191        Dated February 15, 1977

Inventor(s) Joseph Jagur-Grodzinski et al

It is certified that error appears in the above-identified patent and that said Letters Patent are hereby corrected as shown below:

Column 6, line 6: "$\eta$" should read -- $\{\eta\}$ --; line 25: "3.5" should read -- 3.5 g. --; line 27: "0.1" should read -- 0.1 g. --.

Columns 7-8, Table III, last column, line 1: "14.6" should read -- 14.3 --.

Signed and Sealed this twenty-third Day of August 1977

[SEAL]

Attest:

RUTH C. MASON
*Attesting Officer*

C. MARSHALL DANN
*Commissioner of Patents and Trademarks*